United States Patent [19]

Okuda

[11] Patent Number: 4,523,074
[45] Date of Patent: Jun. 11, 1985

[54] WIRE ELECTRODE PULL-UP MECHANISM IN WIRE-CUT ELECTRIC DISCHARGE MACHINE

[75] Inventor: Kanemasa Okuda, Hino, Japan
[73] Assignee: Fanuc Ltd., Minamitsuru, Japan
[21] Appl. No.: 428,288
[22] Filed: Sep. 29, 1982
[30] Foreign Application Priority Data
  Oct. 2, 1981 [JP] Japan .................. 56-157190
[51] Int. Cl.³ .................................... B23P 1/08
[52] U.S. Cl. ................ 219/69 W; 219/69 R; 242/151
[58] Field of Search ............ 219/69 W, 69 E, 69 R; 188/65.1; 242/156.1, 151, 149

[56] References Cited
U.S. PATENT DOCUMENTS

| | | | |
|---|---|---|---|
| 3,729,068 | 4/1973 | Fuller | 188/65.1 |
| 3,987,270 | 10/1976 | Ullmann et al. | 219/69 W |
| 4,347,423 | 8/1982 | Katsube et al. | 219/69 W |
| 4,367,392 | 1/1983 | Girardin | 219/69 W |
| 4,383,161 | 5/1983 | Corcelle | 219/69 W |

FOREIGN PATENT DOCUMENTS

| | | |
|---|---|---|
| 0021715 | 1/1981 | European Pat. Off. |
| 2066717 | 7/1981 | United Kingdom |

*Primary Examiner*—M. H. Paschall
*Attorney, Agent, or Firm*—Staas & Halsey

[57] ABSTRACT

A wire electrode pull-up mechanism in a wire-cut electric discharge machine having an energized wire electrode stretched between upper and lower guides for machining a workpiece wherein the wire electrode pull-up mechanism pulls up a wire electrode which has been passed through a bore in the workpiece until the upper end of the wire electrode protrudes from the upper side of the workpiece, and includes a gripping member for gripping the wire electrode. The gripping member includes an arm having a bearing wall at the distal end thereof; a clamping member pivotally provided on the arm and having a cam body and a restraining portion for abutting against the bearing wall of the arm; a spring member for urging the clamping member in such a manner that the restraining portion thereof abuts against the bearing wall; and an operating member pivotally provided on the arm and having a cam operating portion abutting against the cam body of the clamping member for pivoting the clamping member, the operating member being pivoted owing to pressured contact with the upper surface of the workpiece. The clamping member is pivoted as the operating member abuts against the workpiece, in such a manner that the clamping member causes a gap to be formed between the restraining portion and the bearing wall, and the operating member separates from the workpiece when the arm is raised.

8 Claims, 19 Drawing Figures

WIRE ELECTRODE PULL-UP MECHANISM IN WIRE-CUT ELECTRIC DISCHARGE MACHINE

BACKGROUND OF THE INVENTION

This invention relates to a wire electrode pull-up mechanism in a wire-cut electric discharge machine and, more particularly, to a wire electrode pull-up mechanism for gripping and pulling up a wire electrode.

A so-called wire-cut electric discharge machine, namely an electric discharge machine which uses a wire electrode as a cutter, operates by impressing a pulsed voltage between a wire electrode and a workpiece to produce an electrical discharge or spark across the intervening space for the purpose of eroding the workpiece where the spark occurs. By simultaneously moving the workpiece relative to the wire electrode on the basis of machining command data, the workpiece may be cut into any desired contour. There are occasions where the wire electrode breaks within the workpiece during the cutting operation if such machining cutting conditions as the wire electrode feed speed and tension are improper. In the event of such breakage, it is required that this fact be sensed by circuitry within the discharge machine and that the wire electrode be restored automatically without delay.

An apparatus for restoring a wire electrode has already been proposed by the Inventors in, for example, Japanese Patent Application No. 54-075227. With this previously disclosed apparatus, a limit switch for sensing breakage of the wire electrode is operable to suspend an electric discharge cutting operation immediately upon sensing breakage of the electrode during the passage thereof through the workpiece. At the same time, a clamping mechanism located below the workpiece is activated to clamp the wire electrode and prevent it from falling on the supply side. The used wire electrode, namely the wire electrode passed through the workpiece and located on the take-up side, is then pulled up by feed rollers and fed into a wire electrode disposal mechanism where the wire may be cut up into small pieces, by way of example. Next, the remaining portion of the wire electrode which has broken off in the workpiece is pulled downwardly until the upper end of the broken wire is extracted from the workpiece. Thereafter, with the aid of a guiding device such as a nozzle, said end of the wire electrode is again fed into the slit formed in the workpiece by the electric discharge until the wire end emerges a predetermined distance from the top side of the workpiece. Now, a wire electrode pull-up mechanism located on the take-up side of the workpiece grips the protruding end of the wire electrode, pulls the wire electrode upwardly and feeds it into the feed rollers which then grasp the electrode between them, thereby completing the restoration of the wire electrode.

In the prior-art apparatus described above, the wire electrode pull-up mechanism is provided with a wire electrode gripping device having a construction which will now be described with reference to FIGS. 1(a), 1(b) and 1(c).

Figure 1A:
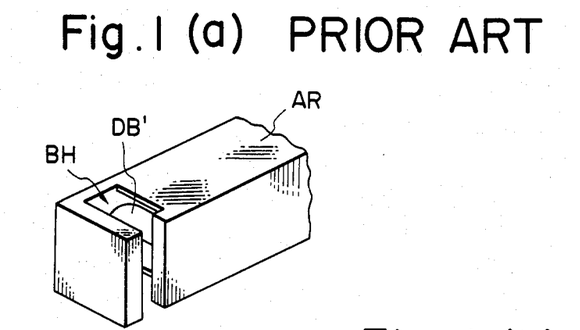
FIG. 1(a) is a perspective view, and FIGS. 1(b) and 1(c), sectional side views, illustrating a gripping member on a wire electrode pull-up mechanism according to the prior art.
Figures 1B, 1C:
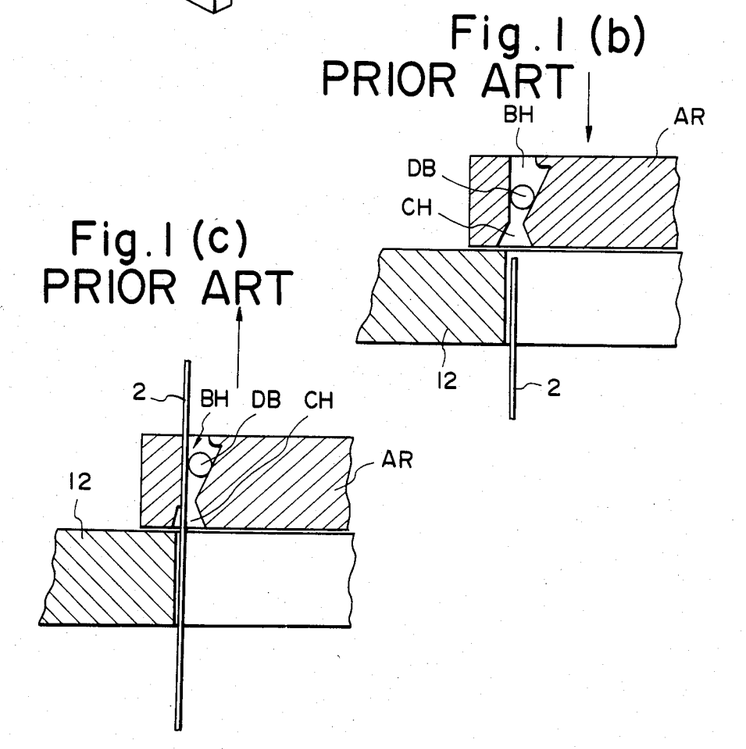

FIG. 1(a) is a perspective view and FIGS. 1(b) and 1(c) are sectional views illustrating the gripping device of the conventional wire electrode pull-up mechanism. In FIGS. 1(a) and 1(b), the gripping device has an arm AR at the distal end formed to include a downwardly tapered hole BH and a downwardly flared guide hole CH communicating therewith. The tapered hole BH receives a rotatable clamping roller DB movable freely up and down within the hole. In restoring a wire electrode 2 which has broken, the arm AR is lowered until it abuts against the top surface of the workpiece 12, as shown in FIG. 1(b). This is followed by passing the end of the broken wire electrode 2 upwardly through the workpiece 12 and into the guiding hole CH and tapered hole BH of the arm AR until the wire end pushes up the clamping roller DB and emerges from the arm on the upper side thereof, as illustrated in FIG. 1(c). Thenceforth, the arm AR is raised in the direction of the arrow shown in FIG. 1(c), whereupon the clamping roller DB slides downwardly under its own weight along the wall of the tapered hole BH. Owing to the oblique wall of the hole BH, the roller DB wedges the wire electrode 2 against the opposing surface to clamp the wire in place. Raising the arm AR therefore causes the wire electrode 2 to be pulled upwardly as the arm ascends.

A problem encountered in a wire-cut electric discharge machine having a gripping device of the above-described type involves the matter of wire diameter. Specifically, for reasons of cutting precision and the like, it is preferred to make use of a wire electrode which is as slender as possible. However, owing to the construction of the gripping device which requires that the end of the wire electrode push up the clamping roller, the wire must have sufficient rigidity and, hence, there is a limitation on how slender the wire may be. Accordingly, there is need of a wire electrode pull-up mechanism capable of clamping and pulling up even a very slender wire electrode.

SUMMARY OF THE INVENTION

Accordingly, an object of the present invention is to provide a wire electrode pull-up mechanism which is capable of clamping and pulling up a slender wire electrode.

Another object of the present invention is to provide a wire electrode pull-up mechanism which is capable of clamping a slender wire electrode in a reliable manner.

Still another object of the present invention is to provide a wire electrode pull-up mechanism in which a wire electrode meets little resistance in being passed through the mechanism, and in which the wire electrode can be clamped rigidly in place thereafter.

Yet another object of the present invention is to provide a wire electrode pull-up mechanism which is capable of clamping a wire electrode through utilizing the force applied by a gripping member as said member is raised with respect to the workpiece.

A further object of the present invention is to provide a wire electrode pull-up mechanism which is capable of improving the cutting precision of a wire-cut electric discharge machine by utilizing a very slender wire electrode.

According to the present invention, these and other objects are attained by providing, in an electric discharge machine of the type having an energized wire electrode stretched between upper and lower guides for cutting a workpiece moved against the wire electrode, a mechanism for pulling up the wire electrode from a bore in the workpiece after the wire electrode has been re-inserted through the bore following breakage. The pull-up mechanism comprises a gripping member for gripping the wire electrode. The gripping member includes an arm having a bearing wall at the distal end thereof; a clamping member pivotally provided on the arm and having a cam body and a restraining portion for abutting against the bearing wall of the arm; a coiled spring for urging the clamping member in such a manner that the restraining portion thereof abuts against the bearing wall; and an operating rod pivotally provided on the arm and having a cam operating portion abutting against the cam body of the clamping member for pivoting the clamping member, the operating rod being pivoted owing to pressured contact with the upper surface of the workpiece when the gripping member is lowered into abutting contact with the upper surface of the workpiece by the drive member. The clamping member is pivoted by the cam operating portion as the operating rod abuts against the workpiece, in such a manner that the clamping member causes a gap to be formed between the restraining portion and the bearing wall, and the operating rod separates from the workpiece when the arm is raised, whereby the clamping member is pivoted by the coiled spring so that the upper end of the wire electrode, inserted into the gap, is retained between the restraining portion of the clamping member and the bearing wall of the arm.

Other features and advantages of the invention will be apparent from the following description taken in connection with the accompanying drawings.

DETAILED DESCRIPTION OF THE PREFERRED EMBODIMENTS

Figure 2:
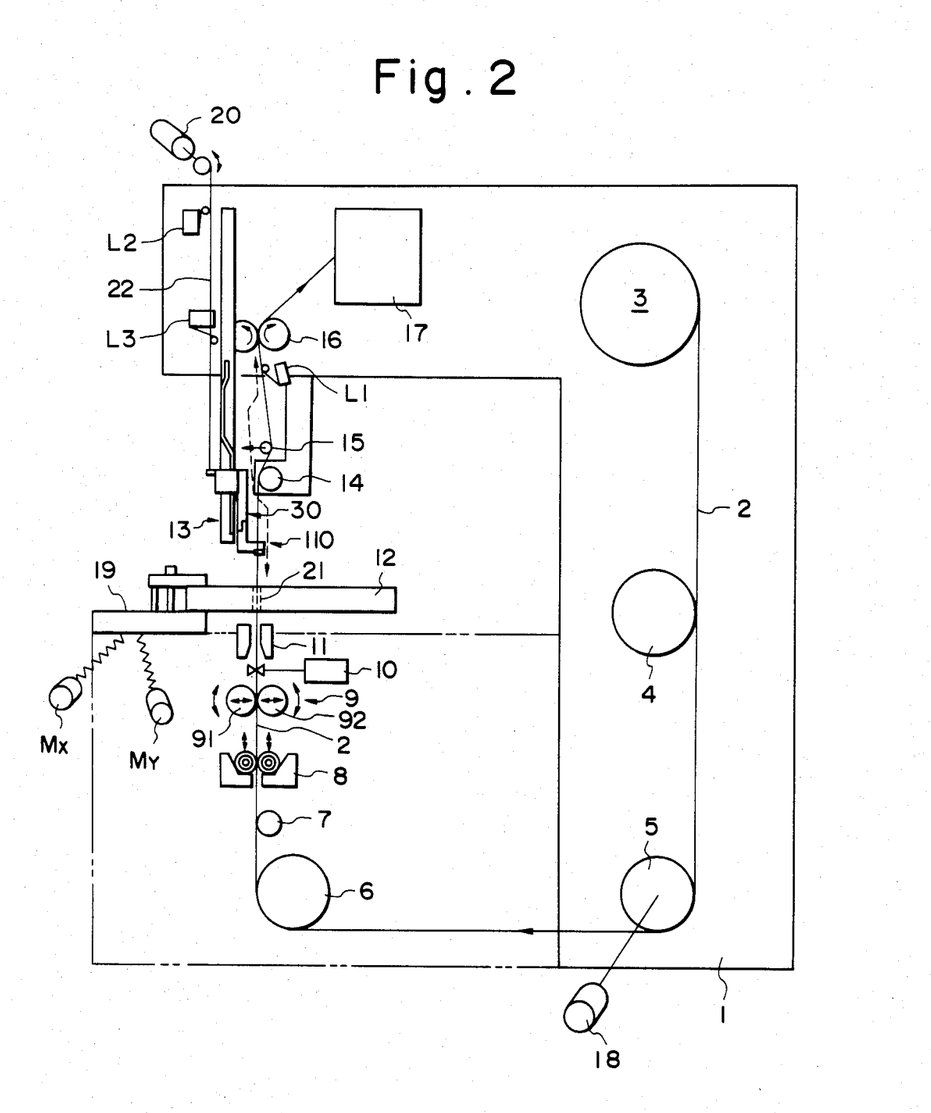
FIG. 2 is a front view illustrating the overall construction of the mechanical portion of a wire-cut electric discharge machine to which the present invention can be applied.

The overall construction of a wire-cut electric discharge machine to which the present invention can be applied is illustrated in FIG. 2. The machine includes a column 1, a wire electrode 2 for cutting a workpiece 12, a wire electrode supply reel 3, a wire electrode tension brake 4, guide rollers 5, 6 for guiding the wire electrode 2, a lower guide 7 for the wire electrode, a wire electrode clamping mechanism 8, a wire electrode feed mechanism 9, a wire electrode position detecting mechanism 10, a nozzle 11 located directly below the cutting position, and a wire electrode pull-up mechanism 13 provided at one end with a wire electrode gripping device 30 having a gripping member 110 at the distal end thereof. The machine further comprises an upper guide 14 for the wire electrode 2, a conduction pin 15 for supplying the wire electrode 2 with electric current, feed rollers 16 for feeding the wire electrode, a unit 17 for disposing the wire electrode, an encoder 18 for sensing the rotational position of the guide roller 5, a table mechanism 19 for supporting the workpiece 12, workpiece feed motors MX, MY for transporting the table mechanism 19, namely the workpiece 12, in X and Y directions, respectively, a drive motor 20 for driving the wire electrode pull-up mechanism 13, a limit switch L1 for sensing breakage of the wire electrode 2, a limit switch L2 which senses when lowering of the wire electrode pull-up mechanism 13 has been completed, and a limit switch L3 which senses when elevation of the pull-up mechanism has been completed.

In operation, the wire electrode is guided substantially vertically from the lower guide 7 to the upper guide 14 and is pulled and fed upwardly by the feed roller 16 longitudinally so as to travel by the part of the machine where the workpiece 12 is cut. A prescribed voltage is impressed across the wire electrode 2 and the workpiece 12, and the latter is moved in a horizontal plane by the feed motors MX, MY in a predetermined manner so as to be cut along a desired path by the electric discharge.

According to the embodiment of the invention, the clamping mechanism 8 is provided on the supply side of the wire electrode 2 and is adapted to clamp a portion of the wire electrode 2 instantaneously upon breakage, thereby preventing it from falling under its own weight. Meanwhile, the nozzle 11 and the wire electrode feed mechanism 9 provided on the supply side for grasping and feeding the above-mentioned portion of the electrode cooperate to position the upper end of the electrode at a predetermined point. This enables the portion of the broken wire electrode 2 remaining on the supply side to be re-threaded through a slit or bore 21 located in the workpiece and then delivered to the upper guide 14 and feed roller 16, which then proceeds to feed the wire electrode to the disposing unit 17. Thus, when the wire electrode breaks, restoration of the wire can take place in a fully automatic manner.

Figure 3:
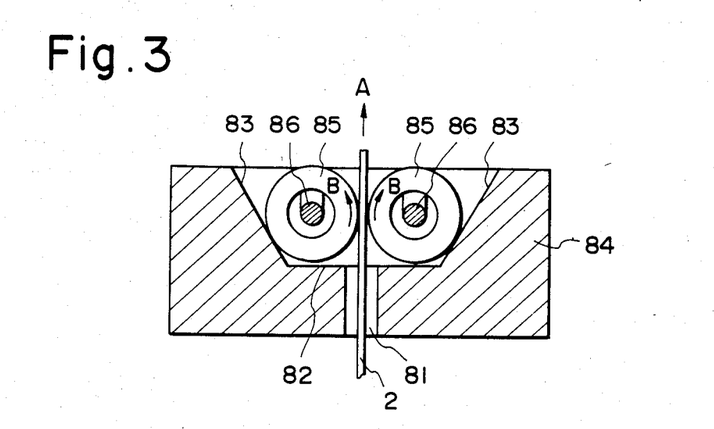
FIGS. 3 and 4 are sectional front views illustrating the construction of the wire electrode clamping mechanism of FIG. 2.
Figure 4:
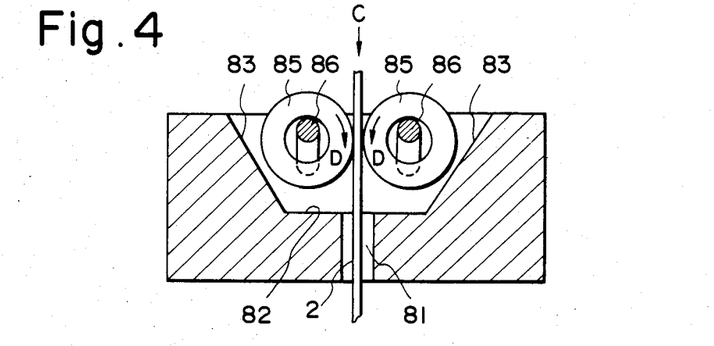
Figure 5:
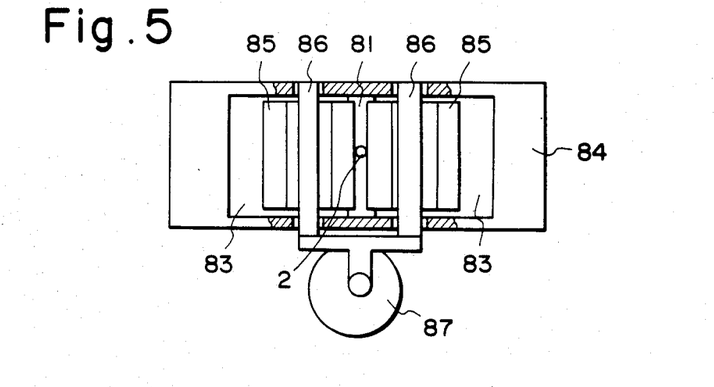
FIG. 5 is a top view, partially in section, illustrating the clamping mechanism of FIGS. 3 and 4.

The construction of the clamping mechanism 8 for clamping the wire electrode 2 can be best understood from FIGS. 3 through 5. The clamping mechanism 8 includes a pair or knurled rollers 85 set into a block 84 having a slit 81 to permit the passage of the wire electrode 2 therethrough, a pair of inclined walls 83 defining an inwardly tapered surface, and a bottom surface 82. The rollers 85 are loosely mounted on corresponding shafts 86 that are caused to occupy the positions shown in FIG. 4 by activating a plunger magnet 87, or the positions shown in FIG. 3 by deactivating the plunger magnet 87.

The plunger magnet 87 is deactivated during the course of a normally proceeding discharge machining operation, so that the rollers 85 are positioned as shown in FIG. 3. The rollers 85 rotate freely in the directions indicated by the arrows B as the wire electrode 2 is fed upwardly in the direction shown by arrow A, and therefore permit the upward passage of the wire through the block 84. When the wire breaks in the vicinity of the workpiece 12, the portion of the wire electrode above the rollers 85 is no longer tensioned and the wire tends to be pulled downward under its own weight. However, the pair of rollers 85, owing to their knurled surfaces and in cooperation with the inwardly inclined walls 83, function to grasp and clamp the wire electrode immediately upon breakage. The plunger magnet 87 is then activated to move the shafts 86 to the positions shown in FIG. 4, thereby disengaging the rollers 85 from the inwardly inclined walls 83 so that the rollers can now rotate in the directions of the arrows D when the wire electrode 2 moves in the direction of the arrow C. Thus, the rollers 85 when positioned as shown in FIG. 4 permit the downward passage of the wire electrode 2, but are still free to rotate in the directions B, allowing the wire electrode to be moved upwardly through the block 84, that is, in the direction A, as will be required in a later step.

Referring now to FIGS. 6 through 9 for a detailed description of the construction and operation of the wire feed mechanism 9, the feed mechanism includes a pair of drive rollers 91, 92 coupled to a motor 99 through respective shafts 93, 94 and gear mechanisms 95, 96, 97, 98. The shafts 93, 94 are journalled in bearings 100, 101 attached to one end of respective leaf springs 102, 103, and a plunger magnet 109 is connected to the bearings 100, 101 through a lever mechanism comprising lever elements 104, 105, 106, 107 and 108.

Figure 6:
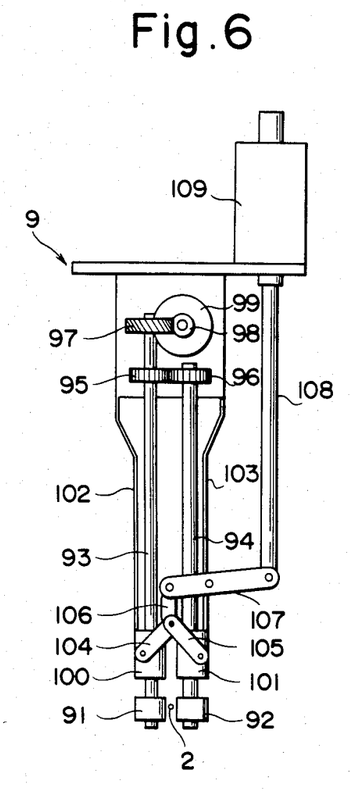
FIGS. 6 and 7 are top views illustrating a wire electrode feed mechanism shown in FIG. 2.
Figure 7:
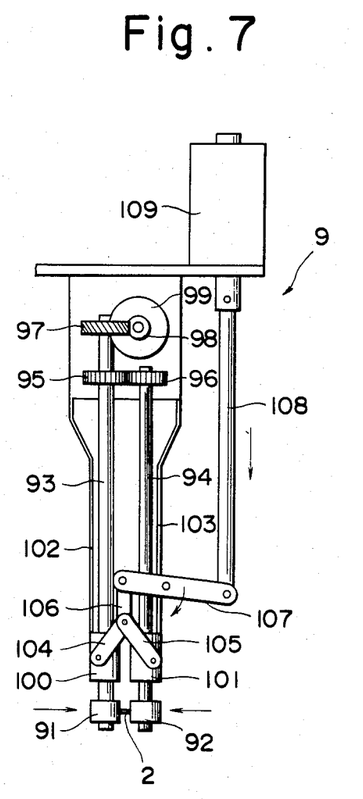
Figure 8:
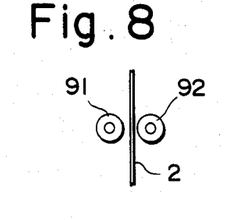
FIGS. 8 and 9 are side views useful in describing the operation of the wire electrode feed mechanism shown in FIGS. 6 and 7.
Figure 9:
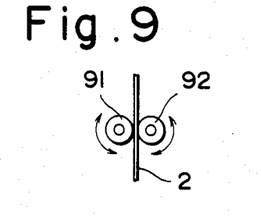

The magnet 109 of the wire feed mechanism 9 is deactivated during the course of the machining operation, so that the drive rollers 91, 92 are spaced from each other and do not contact the wire electrode 2, as illustrated in FIGS. 6 and 8. The magnet 109 is activated only when the electrode breaks. When such is the case, the magnet 109 depresses the lever 108 in the direction of the arrow in FIG. 7, thereby pivoting the lever element 107 clockwised and causing the lever elements 106, 105, 104 to cooperate in moving the shafts 93, 94 toward each other against the biasing force of the leaf springs 102, 103 so as to bring the bearings 100, 101 and, hence, the drive rollers 91, 92, closer together, the latter clamping the wire electrode 2 between them, as shown in FIGS. 7 and 9. Accordingly, when the motor 99 coupled to the drive rollers 91, 92 via the gear mechanism and shafts 93, 94 is rotated in one direction, the drive rollers 91, 92 pull the wire electrode 2 upwardly and, when rotated in the other direction, the drive rollers 91, 92 pull the wire electrode 2 downwardly, as shown in FIG. 9.

The detector 10 shown in FIG. 2 ordinarily is in contact with the wire electrode 2. When the wire electrode breaks and is pulled downward by the wire electrode feed mechanism 9 after being clamped by the clamping mechanism 8, the detector 10 is operable to detect the end of the broken wire as it passes by, and to deliver a signal indicative of this fact to the motor 99. The signal halts the motor 99 so that the drive rollers 91, 92 which are pulling the broken wire down are stopped before the end of the wire reaches them. The broken end of the wire electrode 2 is now located below the workpiece and remains there until the arrival of a signal csuses the wire electrode feed mechanism 9 to feed the wire upwardly by a prescribed amount through a hole in the workpiece.

Figure 10:
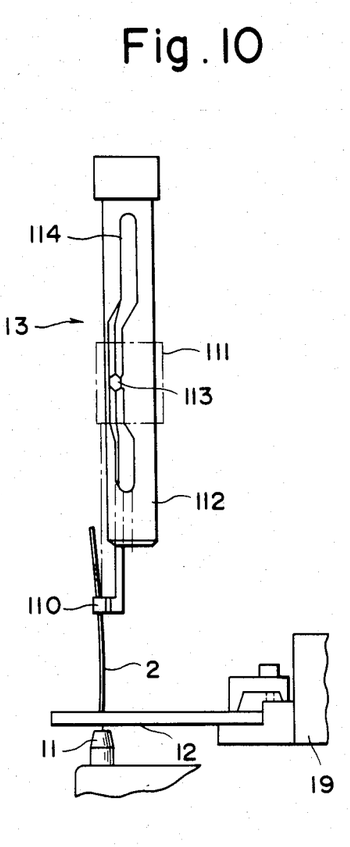
FIG. 10 is a front view and FIG. 11 a side view, partially in section, illustrating the construction of a wire electrode pull-up mechanism according to the present invention.
Figure 11:
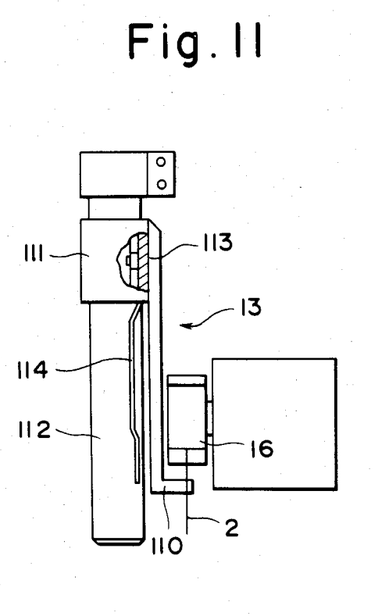

The wire electrode pull-up mechanism 13 shown in FIG. 2 is depicted in greater detail in FIGS. 10 through 14. Referring first to FIGS. 10 and 11, the mechanism includes a wire electrode gripping member 110, a sliding member 111 coupled to the gripping member, and a tube 112 whose periphery has a longitudinally extending coulisse 114. The sliding member 111 is provided with a pin 113 engaging with the coulisse 114, and is capable of sliding up and down along the tube 112. Thus, the sliding portion 111, in moving along the tube 112, is constrained to turn in a particular manner which is decided by the shape of the coulisse 114. The sliding portion 111 is turned in order that the pull-up mechanism 13 will not interfere with the upper guide 14 at the stage where the wire electrode 2 is set between the feed rollers 16 shown in FIG. 2.

Figure 12:
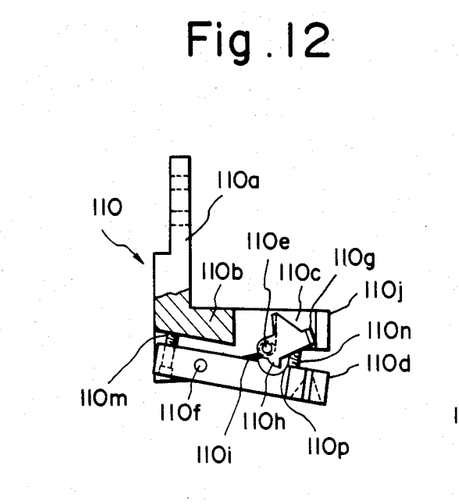
FIG. 12 is a side view, partially in section, illustrating a gripping member of the wire electrode pull-up mechanism shown in FIGS. 10 and 11.
Figure 13:
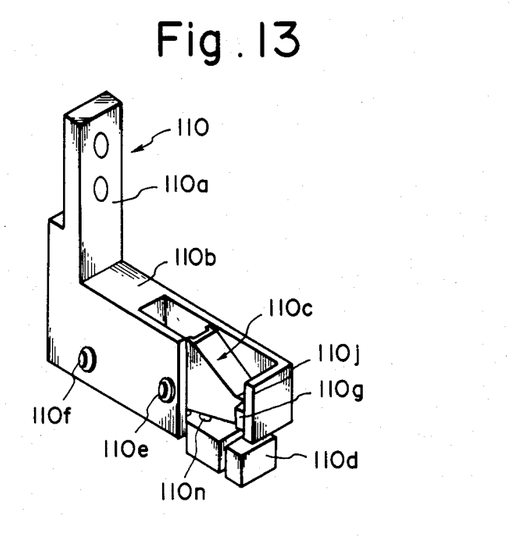
FIG. 13 is a perspective view showing the gripping device of FIG. 12.
Figure 14:
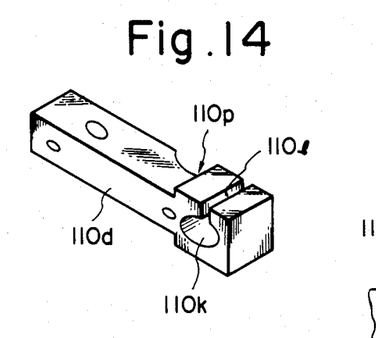
FIG. 14 is a perspective view illustrating an operating rod shown in FIGS. 12 and 13.
Figure 15:
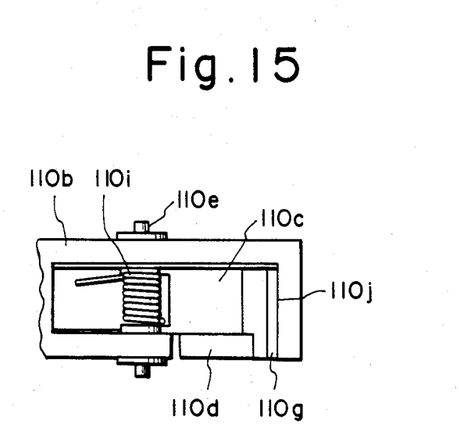
FIG. 15 is a fragmentary top view illustrating the distal end of an arm of the gripping member shown in FIG. 13.

Referring to FIGS. 12 and 13, the gripping member 110 comprises a mounting portion 110a and an arm portion 110b which meets the mounting portion 110a at right angles. The arm portion 110b has a cavity for accommodating a clamping member 110c and an operating rod 110d which are pivotally supported by shafts 110e, 110f, respectively. The clamping member 110c includes a restraining portion 110g and a cam body 110h. A coiled spring 110i is wound on the pivot shaft 110e and, as shown in FIG. 12, urges the clamping member 110c in the clockwise direction, thereby bringing the restraining portion 110g thereof into abutting pressing contact with a wall 110j for bearing the applied pressure. The wall 110j, constituting a portion of the arm 110b, will be referred to as a bearing wall hereinafter. As shown in FIG. 14, one end of the operating rod 110d pivoted at the support shaft 110f is formed to include a cone-shaped nozzle 110k, and a slit 110l from which the wire electrode 2, which has been passed through the nozzle 110k, is released. Further, as shown in FIG. 12, the operating rod 110d is provided with a position adjusting screw 110m, a position adjusting screw 110n which serves also as a member for pushing up the clamping member 110c, and a cam operating surface 110p. The distal end of the gripping portion 110 as seen from above is shown in FIG. 15.

Described next will be the manner in which the pull-up mechanism pulls up a broken wire electrode.

The gripping member 110 is lowered via a cord 22 (FIG. 2) by rotating the motor 20. The cord 22 slackens when the gripping member 110 comes to rest upon the upper surface of the workpiece 12, and the limit switch L2 opens upon sensing the slack in the cord, thereby deactivating the motor 20. As the foregoing takes place, the gripping member 110 operates in the following manner. As shown in (a) of FIG. 16, the end of the operating rod 110d is the first part of the gripping member 110 to abut against the upper surface of the workpiece 12 as the gripping member is lowered. As the gripping member 110 continues to be lowered, the operating rod 110d pivots in the counter-clockwise direction about the pivot shaft 110f, causing the upper end of the position adjusting screw 110n to abut against the clamping member 110c. With further descent of the gripping member 110, as shown in (b) of FIG. 16, the position adjusting screw 110n rotates the clamping member 110c counter-clockwise so that the cam body 110h of the clamping member is situated above the cam operating portion 110p of the operating rod 110d. As the gripping member 110 continues to be lowered, the cam operating portion 110b presses up on the cam body 110h, thereby amplifying the effect of the operating rod 110d to swing the clamping member 110c through a large angle in the counter-clockwise direction. As a result, the clamping member 110c is rotated through an angle of about 90 degrees from the position shown in FIG. 16(a). The coiled spring 110i, it should be noted, is twisted and tightly compressed by the clamping member 110c as it is rotated. When the lower surface of the operating rod 110 finally comes into surface-to-surface abutting contact with the upper surface of the workpiece 12, cord 22 slackens, limit switch L2 opens, and motor 20 is stopped to halt the descent of the gripping member 110. This is the condition shown in (c) of FIG. 16, in which the operating rod 110 is shown flush against the upper surface of the workpiece, with the nozzle 110k in alignment with the hole 21 in the workpiece.

Figure 16:
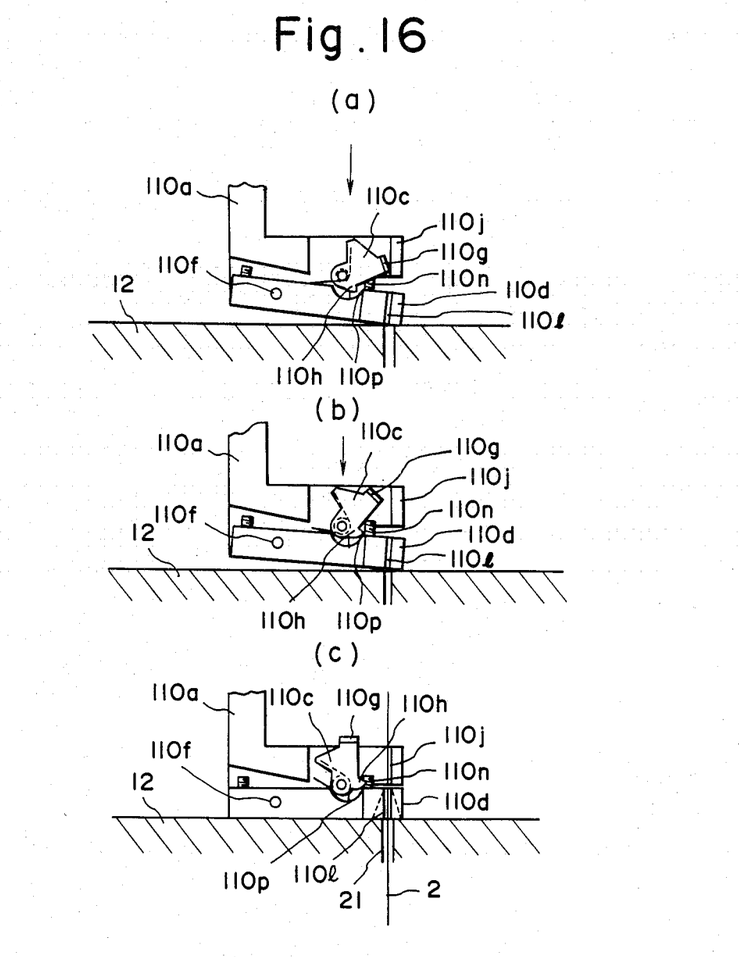
FIGS. 16(a), 16(b) and 16(c) are side views useful in describing the operation of the gripping member shown in FIGS. 12 through 15.

Next, the wire electrode feed mechanism 9 is actuated to feed the wire electrode 2 upwardly, whereupon the upper end of the broken wire electrode 2 is threaded through the bore 21 in the workpiece 12 and passed directly through the nozzle 110k of the operating rod 110d. The wire then passes the inner side of the bearing wall 110j at the end of the arm 110b and emerges from the upper side of the arm, as shown in (c) of FIG. 16. Thus the wire electrode 2 may pass completely through and emerge from the gripping member 110 without meeting any substantial resistance. This is followed by running the motor 20 in the reverse direction, whereby the gripping member 110 is raised. Now the operating rod 110d is rotated in the clockwise direction about the pivot shaft 110f owing to the restoration force of the coiled spring 110i. As the operating rod 110d is rotated in this manner, the effect of the relaxing spring 110i and of the engaging cam operating portion 110p and cam body 110h causes the clamping member 110c to rotate through a large angle in the clockwise direction. As the clamping member 110 continues to be raised, the restraining portion 110g comes into contact with the wire electrode 2 and presses it against the bearing wall 110j, applying a clamping force to the wire electrode to hold it firmly in place as the gripping member 110 continues to rise. Owing to the wedge effect of the restraining portion 110g, any attempt by the wire electrode 2 to fall under its own weight is fully counteracted by a stronger clamping force, assuring that the wire electrode 2 will not fall. The gripping member 110 thus is raised while carrying the clamped wire electrode 2 along with it. At the end of the elevating operation, limit switch L3 (FIG. 2) is closed to suspend the rotation of the motor 20. At this time the upper end of the wire electrode 2 has been pulled up to a position high enough to permit it to be engaged by the feed rollers 16, as shown in FIG. 11, the latter then being driven to feed and pull up the wire electrode 2 grasped between them, whereby the end of the wire is introduced into wire electrode disposing unit 17.

The gripping member 110 is at rest when the wire electrode 2 is pulled up by the feed rollers 16. Owing to the upward movement of the wire electrode under the action of the feed rollers at such time, the clamping member 110c pivots slightly in the counter-clockwise direction so that the restraining portion 110g thereof exerts less force upon the bearing wall 110j. The wire electrode 2 may therefore pass through the gripping member 110 with facility as it is being fed into the disposing unit 17. After this latter step has been accomplished, the gripping member 110 is turned about the longitudinal axis of the mounting portion 110a thereof while being lowered slightly, whereupon the wire electrode 2 slips out from between the restraining portion 110g and bearing wall 110j and exits from the gripping member 110 completely via the slit 110l. This establishes the condition for a resumption of the electric discharge machining operation.

In pulling up the wire electrode 2 by means of the pull-up mechanism 13 and feeding the end of the wire into the roller mechanism 16, the conduction pin 15 is retracted to permit proper delivery of the wire electrode to the upper guide 14. This is accomplished by the conduction pin retracting mechanism illustrated in FIG. 17.

Figure 17:
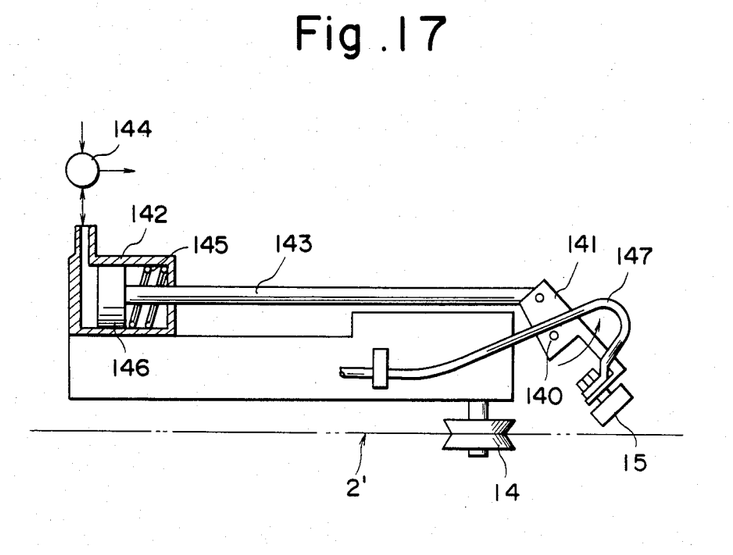
FIG. 17 is a rear view, partially in section, illustrating a conduction pin retraction mechanism shown in FIG. 2.

With reference to FIG. 17, the conduction pin 15 is mounted on a lever 141 which is capable of being pivoted about a pivot point 140 by a piston rod 143 connected at one end to the lever 141 and at the other end to a piston 146 within a cylinder 142. Opening a valve 144 communicates the interior of the cylinder 142 with the atmosphere and allows a spring 145 to urge the piston 146, and hence the piston rod 143, to the extreme left as shown in FIG. 17. This causes the lever 114 to rotate counter-clockwise about the pivot point 140 so that the conduction pin 15 is swung into the retracted position away from the path 2' along which the wire electrode will travel. This facilitates the threading of the wire electrode into the upper guide 14.

On the other hand, closing the valve 144 sends a pressurizing fluid into the cylinder 142 so that the piston 146 and its piston rod 143 are driven as far to the right as possible, thereby rotating the lever 141 clockwise. This swings the conduction pin 15 back into the operating position shown in FIG. 2, so that the pin may contact the wire electrode. Numeral 147 in FIG. 17 designates a cable for connecting the conduction pin to a power supply.

It should be noted that a nozzle for supplying a machining liquid, or dielectric, can also be mounted on the above retraction mechanism together with the conduction pin so that the nozzle can also be swung away from the wire electrode. Furthermore, the machining liquid can be employed as the pressurizing fluid delivered to the cylinder 142.

In accordance with the present invention as described and illustrated hereinabove, the gripping member 110 for gripping the end of the wire electrode 2 is provided with the pivoted clamping member 110c and operating rod 110d. When the gripping member 110 abuts against the workpiece and grips the wire electrode, the cam operating portion 110p of the operating rod 110d operates on the cam body 110h of the clamping member 110c. As a result, the clamping member 110c is shifted by an amount comparatively large in comparison with the amount of operating rod movement, so that the portion of the clamping member for restraining the wire electrode is swung through a wide arc to permit passage of the wire electrode through the gripping member without obstruction. When the gripping member 110 is separated from the workpiece surface to clamp the wire electrode, the action of the cam operating portion on the cam body causes the clamping member 110c to pivot more quickly, with the coiled spring 110i assisting in the pivoting operation. In consequence, the clamping member 110c is pivoted in the electrode clamping direction rapidly and reliably. In accordance with the invention, therefore, a wire electrode, regardless of how slender, may be passed through the gripping member without any resistance. Moreover, since the wire electrode is clamped positively between the restraining portion and the bearing wall owing to the force applied by the coiled spring when the gripping member is raised, the invention assures that the wire electrode will be gripped and pulled up in a very reliable manner.

As many apparently widely different embodiments of the present invention may be made without departing from the spirit and scope thereof, it is to be understood that the invention is not limited to the specific embodiments thereof except as defined in the appended claims.

What we claim is:

1. A wire electrode pull-up mechanism in a wire-cut electric discharge machine having a wire electrode stretched between upper and lower guides for machining a workpiece by means of an electric discharge produced by impressing a voltage between the wire electrode and the workpiece, wherein the wire electrode pull-up mechanism is for pulling up, on the side of the upper guide, a wire electrode which has been passed through a bore in the workpiece until the upper end of the wire electrode protrudes from the upper side of the workpiece, wherein the wire electrode pull-up mechanism comprises:

(a) a gripping member for gripping the wire electrode, and
  (b) a drive means for moving said gripping member up and down relative to the workpiece,
  wherein the gripping member includes:
    (i) an arm having a bearing wall at the distal end thereof,
    (ii) a clamping member pivotally provided on said arm and having a cam body and a restraining portion for abutting against the bearing wall of said arm,
    (iii) a spring means for urging said clamping member in such a manner that the restraining portion thereof abuts against said bearing wall, and
    (iv) an operating member pivotally provided on said arm and having a cam operating portion abutting against the cam body of said clamping member for pivoting said clamping member, said operating member being pivoted owing to pressured contact with the upper surface of the workpiece when said gripping member is lowered into abutting contact with the upper surface of the workpiece by said drive means, wherein said clamping member is pivoted by said cam operating portion as said operating member abuts against the workpiece, in such a manner that said clamping member causes a gap to be formed between said restraining portion and said bearing wall, and wherein said operating member separates from the workpiece when said arm is raised, whereby said clamping member is pivoted by said spring means so that the upper end of the wire electrode, inserted into said gap, is retained between the restraining portion of said clamping member and the bearing wall of said arm.

2. The wire electrode pull-up mechanism according to claim 1, wherein said operating member further comprises a nozzle through which the wire electrode is passed.

3. The wire electrode pull-up mechanism according to claim 2, wherein said operating member further comprises a slit communicating with said nozzle for releasing the wire electrode passed through said nozzle from said operating member.

4. The wire electrode pull-up mechanism according to claim 1, wherein said spring means is a coiled spring.

5. The wire electrode pull-up mechanism according to claim 4, wherein said clamping member further comprises a pivot shaft and wherein said spring means is wound around the pivot shaft of said clamping member.

6. The wire electrode pull-up mechanism according to claim 1, wherein said arm further comprises an opening for receiving said clamping member and said operating member.

7. The wire electrode pull-up mechanism according to claim 1, wherein said drive means comprises:
  (i) a gripping portion for gripping the wire electrode,
  (ii) a tube portion, and
  (iii) a sliding portion connected to said gripping portion and slidable up and down along said tube portion.

8. The wire electrode pull-up mechanism according to claim 7, wherein said tube portion comprises a coulisse and said sliding portion comprises a pin for engaging with the coulisse, said sliding portion being adapted for up and down movement along said coulisse.

* * * * *